US 6,728,350 B2

(12) United States Patent
Ikeda

(10) Patent No.: US 6,728,350 B2
(45) Date of Patent: Apr. 27, 2004

(54) TELEPHONE CONNECTION SYSTEM, TELEPHONE CONNECTING METHOD, HOME TRANSMISSION UNIT AND CONTROL PROGRAMS THEREFOR

(75) Inventor: Saburou Ikeda, Tokyo (JP)

(73) Assignee: NEC Corporation, Tokyo (JP)

(*) Notice: Subject to any disclaimer, the term of this patent is extended or adjusted under 35 U.S.C. 154(b) by 128 days.

(21) Appl. No.: 10/112,713

(22) Filed: Apr. 2, 2002

(65) Prior Publication Data
US 2002/0146099 A1 Oct. 10, 2002

(30) Foreign Application Priority Data
Apr. 5, 2001 (JP) .......................... 2001-107767

(51) Int. Cl.[7] ............................. H04M 11/00
(52) U.S. Cl. .................. 379/93.24; 379/90.01; 379/93.07; 379/212.02
(58) Field of Search ............... 379/93.01, 93.05–93.08, 379/93.14, 93.23–93.25, 93.35, 90.01, 201.01, 201.02, 211.01, 211.02, 212.01, 215.01, 243

(56) References Cited
U.S. PATENT DOCUMENTS

| 5,809,128 | A | * | 9/1998 | McMullin | 379/215.01 |
| 6,072,861 | A | * | 6/2000 | Yu | 379/93.24 |
| 6,097,795 | A | * | 8/2000 | Ungruh et al. | 379/93.35 |
| 6,366,661 | B1 | * | 4/2002 | Devillier et al. | 379/211.01 |
| 6,493,445 | B2 | * | 12/2002 | Garland et al. | 379/243 |

* cited by examiner

Primary Examiner—Wing F. Chan
(74) Attorney, Agent, or Firm—Young & Thompson

(57) ABSTRACT

When a call from a subscriber telephone set 81 is received via a telephone switch 74 and a metallic subscriber line 72 in a subscriber terminal 51, an xDSL home unit 60 generates an electronic mail indicative of the call reception with a metallic subscriber line 72 used as an xDSL line 72 for feeding the electronic mail thus generated via the xDSL line 72, an xDSL station side unit 104 and an internet NW to an internet provider 105 and thence transmitting the mail via an internet NW to a portable telephone radio base station 106 and also to a portable telephone set 107. When a reception request is provided from the portable telephone set 107, the xDSL home unit 60 feeds the call from the subscriber telephone set 81 via the xDSL line 72, an xDSL station side unit 104, the internet NW to the internet provider 105 for transmission of the call via the internet NW to a portable telephone radio base station 106 and also to the portable telephone set 107.

8 Claims, 4 Drawing Sheets

TELEPHONE CONNECTION SYSTEM, TELEPHONE CONNECTING METHOD, HOME TRANSMISSION UNIT AND CONTROL PROGRAMS THEREFOR

BACKGROUND OF THE INVENTION

This application claims benefit of Japanese Patent Application No. 2001-107767 filed on Apr. 5, 2001, the contents of which are incorporated by the reference.

The present invention relates to a telephone connection system, a telephone connection method, a home transmission unit and control programs for their system, more particularly to a telephone connection system, a telephone connection method, a home transmission unit and control programs for said system suitable to for connection via an internet network.

Among recent telephone connection systems is, for instance, VoIP (Voice over IP). In VoIP, a converter for conversion between voice and IP signal is installed as a common trunk in a telephone switch station, and in response to dialing of a particular telephone number by a telephone service subscriber, the common trunk is captured for communication via the internet.

The prior art telephone connection system of this type, as shown in FIG. 3, a subscriber telephone set 1, a metallic subscriber line 2, a telephone switch 3, a common trunk 4, a subscriber telephone set 11, a metallic subscriber line 12, a telephone switch 13, a common trunk 14, a common trunk managing unit 20 and an internet NW.

In this telephone connection system, when the calling subscriber off-hooks the subscriber telephone set 1 and dials a particular number, the telephone switch 3 captures the common trunk 4. The common trunk 4 transmits guidance to the calling subscriber such as to input the opposite side data to the calling subscriber. When the calling subscriber has listened to the guidance dials the telephone number corresponding to the subscriber telephone set 11 of the called subscriber. The common trunk 4 makes an inquiry to the common trunk managing unit 20 via the itnernet NW to find out the common trunk 14 accommodating the subscriber telephone set 11. The common trunk managing unit 20 receives the telephone number of the subscriber telephone set 11 from the common trunk 4, and returns the message that the subscriber telephone set 11 is accommodated in the common trunk 14. According to the returned message data, the common trunk 14 starts the telephone switch 13 to ring the subscriber telephone set 11 for called subscriber. When the called subscriber answers the call, the internet telephone service is provided.

FIG. 4 is a schematic showing of a different prior art telephone connection system.

As shown in the Figure, this telephone connection system comprises a subscriber telephone set 31, a subscriber terminal 32, an xDSL (x Digital Subscriber Line) home modem 33, a splitter 34, a metallic subscriber line 35, a splitter 36, a telephone switch 37, a subscriber telephone set 41, a subscriber terminal 42, an xDSL home model 43, a splitter 44, a metallic subscriber line 45, a splitter 46, an xDSL station side unit 47, an internet provider 45 and an internet NW.

In this telephone connection system, when the calling subscriber off-hooks the subscriber telephone set 31, the set 31 is connected via the splitter 34, metallic subscriber line 35 and the splitter 36 to the telephone switch 37. When the subscriber then dials the telephone number corresponding to the subscriber telephone set 41, the subscriber telephone set 41 is ringed via the splitter 46, the metallic subscriber line 45 and the splitter 44. When the called subscriber answers the call by off-hooking the subscriber telephone set 41, the telephone connection service is provided.

The subscriber terminal 32 is also connected via the xDSL home modem 33, the splitter 34, the metallic subscriber line 35 and the splitter 36 to the xDSL station side unit 47, and thence connected via the internet NW to the internet provider 48. Likewise, the subscriber terminal 42 is connected via the xDSL home model 43, the splitter 44, the metallic subscriber line 45 and the splitter 46 to the xDSL station side unit 47, and thence connected via the internet NW to the internet provider 48. As shown, the subscriber telephone sets 31 and 41 and the subscriber terminals 32 and 42 are used independently although they use metallic subscriber lines 35 and 45 one each.

However, the above prior art telephone connection system has the following problems. In the telephone connection system shown in FIG. 3, it is difficult to keep the line number of common trunks 4 and 14 that corresponds to the traffic, fees of use of the common trunks 4 and 14 are charged to the subscribers, special dials are added to make the operation cumbersome, and the service area is limited. A further problem in the telephone connection system shown in FIG. 4 is that in case when, for instance, the called subscriber has gone out and cannot off-hook the subscriber telephone set 41, the telephone connection service is not provided.

SUMMARY OF THE INVENTION

The present invention has been intended in view of the above background, and it has an object of providing a telephone connection system, a telephone connection method, a home transmission unit and control programs for the system, method and unit, which can provide telephone connection service over a broad zone in response to a simple operation.

According to an aspect of the present invention, there is provided a telephone connection system comprising a first subscriber telephone set, a home transmission unit, a subscriber line, a telephone switch, a second subscriber telephone set, a fast digital communication line, a fast digital switch unit, an internet, an internet provider and a terminal unit, wherein: when the call of the second subscriber telephone set is received via the telephone switch and the subscriber line to the first subscriber telephone set, the home transmission unit generates a called electronic mail indicative of the call reception, and feeds said mail via the fast digital communication line, the fast digital switch unit and the internet to the internet provider for transmission of the data via the internet to the terminal unit, and when a reception request is provided from the terminal unit, the home transmission unit feeds the call via the fast digital communication line, the fast digital switch and the internet to the internet provider for transmission of the data via the internet to the terminal unit.

According to another aspect of the present invention, there is provided a telephone connection system comprising a first subscriber telephone set, a home transmission unit, a subscriber line, a telephone switch, a second subscriber telephone set, a fast digital switch unit, an internet, an internet provider and a terminal unit, wherein: when the call of the second subscriber telephone set is received via the telephone switch and the subscriber line to the first subscriber telephone set, the home transmission unit generates a called electronic mail indicative of the call reception, and feeds said mail via the subscriber line as a fast digital communication line, the fast digital switch unit and the internet to the internet provider for transmission of the data via the internet to the terminal unit, and when a reception request is provided from the terminal unit, the home transmission unit feeds the call via the fast digital communication line, the fast digital switch and the internet to the internet provider for transmission of the data via the internet to the terminal unit.

The fast digital communication line is an xDSL (x Digital Subscriber Line) common to the subscribers.

According to other aspect of the present invention, there is provided a telephone connection method comprising steps of: in response to receipt of a call of a second subscriber telephone set via a telephone switch and a subscriber line to a first subscriber telephone set, generating a called electronic mail indicative of the call reception by a home transmission unit; feeding the mail via a fast digital communication line, a fast digital switch unit and an internet to an internet provider for transmission of data via the internet to an terminal unit; and in response to receipt of a reception request from the terminal unit, feeding the call from via the fast digital communication line, the fast digital switch and the internet to the internet provider for transmission of the data via the internet to the terminal unit.

According to still other aspect of the present invention, there is provided a telephone connection method comprising steps of: in response to receipt of a call of a second subscriber telephone set via a telephone switch and a subscriber line to a first subscriber telephone set, generating a called electronic mail indicative of the call reception; feeding the mail via a subscriber line as a fast digital communication line, a fast digital switch unit and an internet to an internet provider for transmission of data via the internet to a terminal unit; and in response to receipt of a reception request from the terminal unit, feeding the call from the home transmission unit via the fast digital communication line, the fast digital switch and the internet to the internet provider for transmission of the data via the internet to the terminal unit.

According to further aspect of the present invention, there is provided a home transmission unit constructed such that when an external call is received via a subscriber line in a subscriber telephone set, it generates a called electronic mail indicative of the call reception and sends out said mail via a fast digital communication line to a predetermined terminal unit and, when a reception request is provided from the terminal unit, it transmits the call via the fast digital communication line.

The fast digital communication line is an xDSL (x Digital Subscriber Line) common to the subscribers.

According to still further aspect of the present invention, there is provided a control program for causing a computer to execute the functions of the above telephone connection system and a control program for causing a computer to execute the functions of the above home transmission unit.

According to other aspect of the present invention, there is provided a telephone connection system comprising: in response to receipt of a call from a subscriber telephone set via a telephone switch and a metallic subscriber line in a subscriber terminal, generating from an xDSL home unit an electronic mail indicative of the call reception with a metallic subscriber line used as an xDSL line; feeding the generated electronic mail via the xDSL line, an xDSL station side unit and an internet NW to an internet provider; transmitting the mail via the internet NW to a portable telephone radio base station and a portable telephone set; and in response to provision of a reception request from the portable telephone set, feeding by the xDSL home unit the call from the subscriber telephone set via the xDSL line, an xDSL station side unit and the internet NW to the internet provider for transmission of the call via the internet NW to a portable telephone radio base station and to the portable telephone set.

Other objects and features will be clarified from the following description with reference to attached drawings.

PREFERRED EMBODIMENTS OF THE INVENTION

Figure 1:
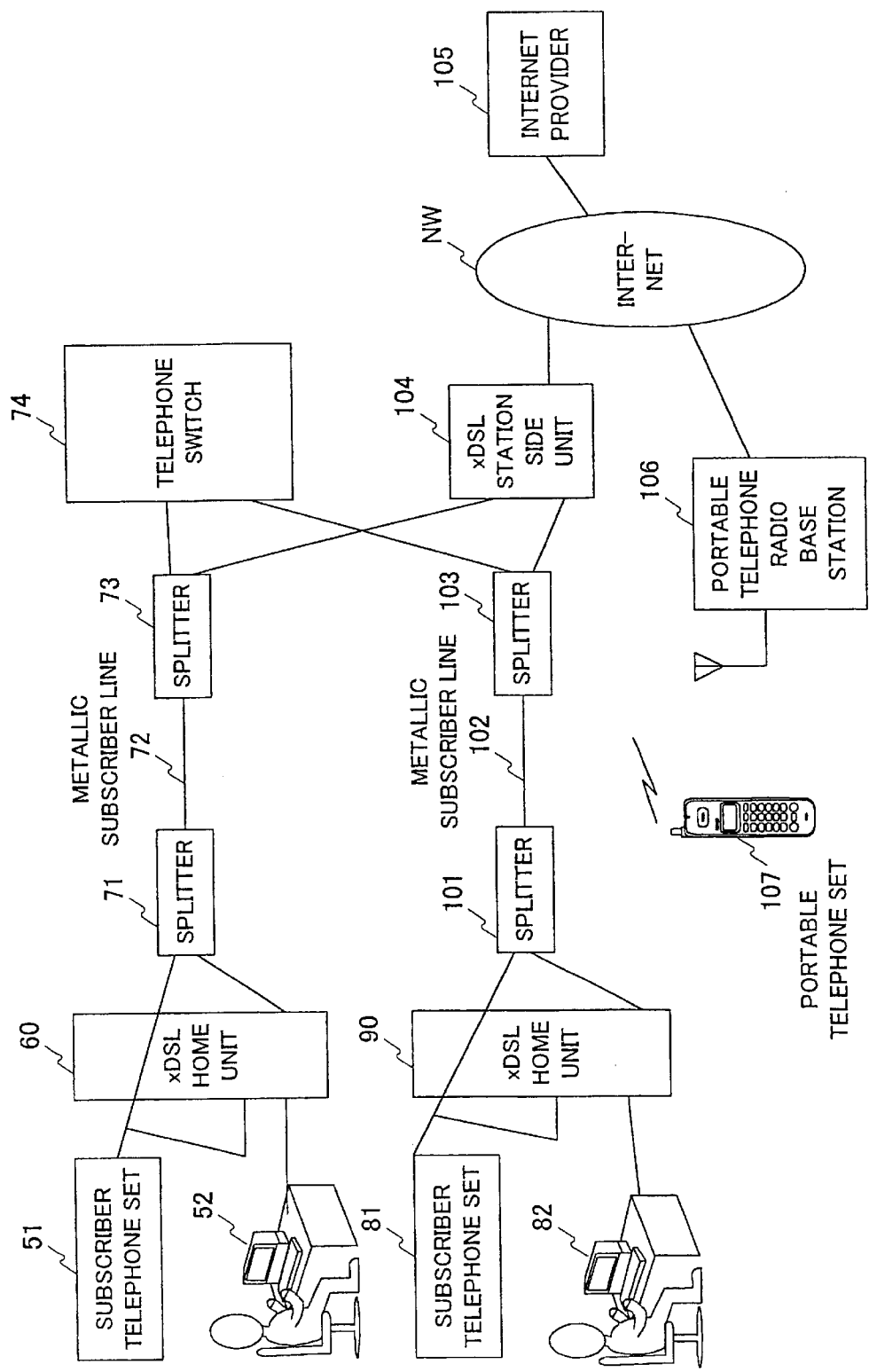
FIG. 1 is a block diagram showing a first embodiment a telephone connection system according to the present invention.

Preferred embodiments of the present invention will now be described with reference to the drawings.

As shown in the Figure, this embodiment of the telephone connection system comprises a first subscriber telephone set 51, a subscriber terminal 52, a home transmission unit (such as xDSL home unit 60), a splitter 71, a subscriber line (such as metallic subscriber line 72), splitter 71, a subscriber line (metallic subscriber line 72), splitter 73, a telephone switch 74, a second subscriber telephone set 81, a subscriber terminal 82, an xDSL home unit 90, a splitter 101, a metallic subscriber line 102, a splitter 103, a fast digital switch unit (such as xDSL station side unit 104, an internet NW, an internet provider 105 and a terminal unit (such as portable telephone radio base station 106 and a portable telephone set 107).

When a call from the subscriber terminal 81 by the calling subscriber operation is received in the subscriber telephone set of the called subscriber via the telephone switch 74 and the metallic subscriber line 72, the xDSL home unit 60 transmits a called electronic mail indicative of that the unit 60 is called, which is generated with the metallic subscriber line 72 used as the fast digital communication line (such as xDSL line 72), via the xDSL line 72, xDSL station side unit 104 and the internet NW to the internet provider 105, and thence via the internet NW to the portable telephone radio base station 106 and the portable telephone set 107. In response to a reception request from the portable telephone set 107, the xDSL home unit 60 transmits the call of the subscriber telephone set 81 via the xDSL line 102, the xDSL station side unit 104 and the internet NW to the internet provider 105 and thence via the internet NW to the portable telephone radio base station 106 and the portable telephone set 107.

Figure 2:
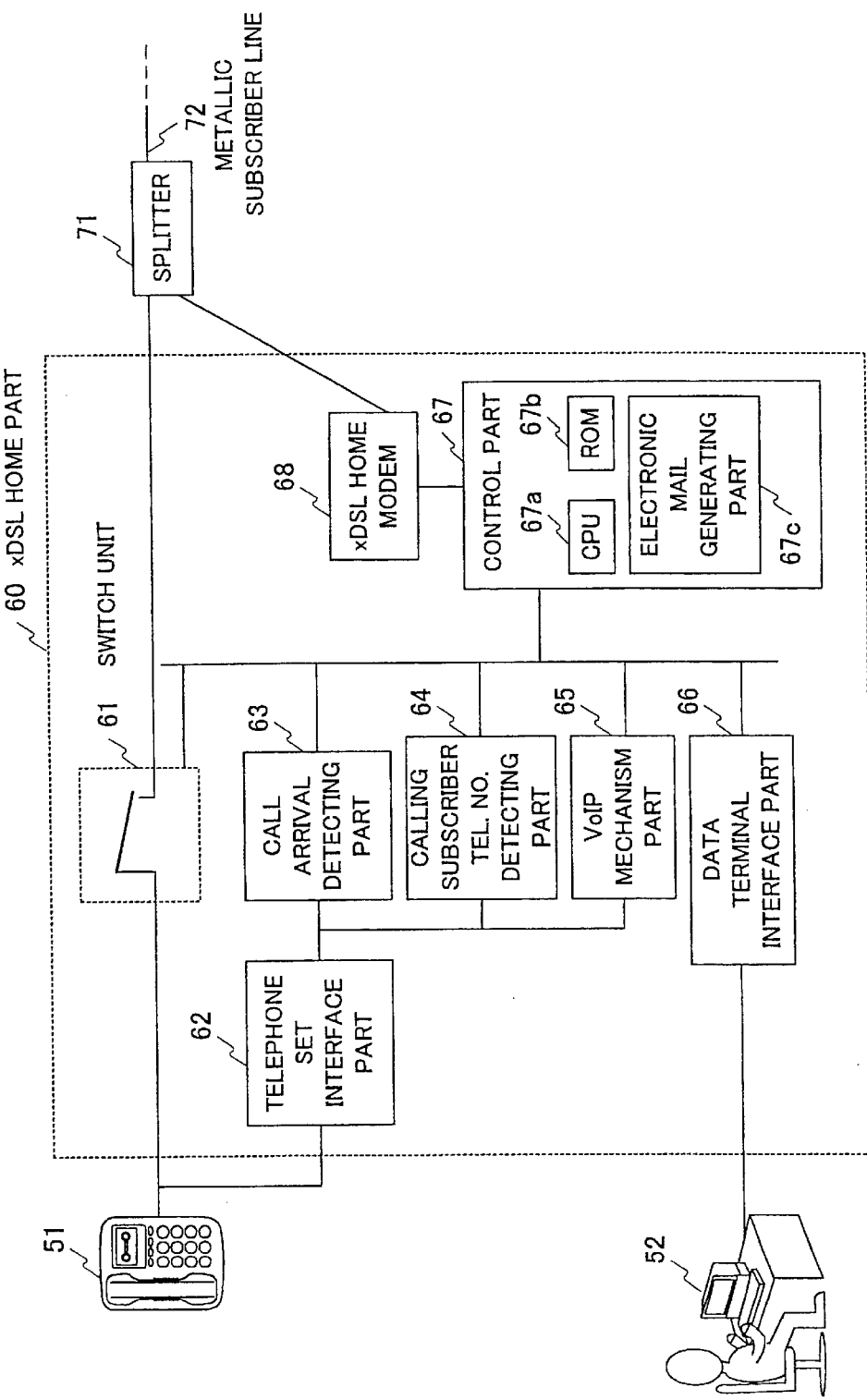
FIG. 2 is a schematic showing the the xDSL home unit 60 shown in FIG. 1.
Figure 3:
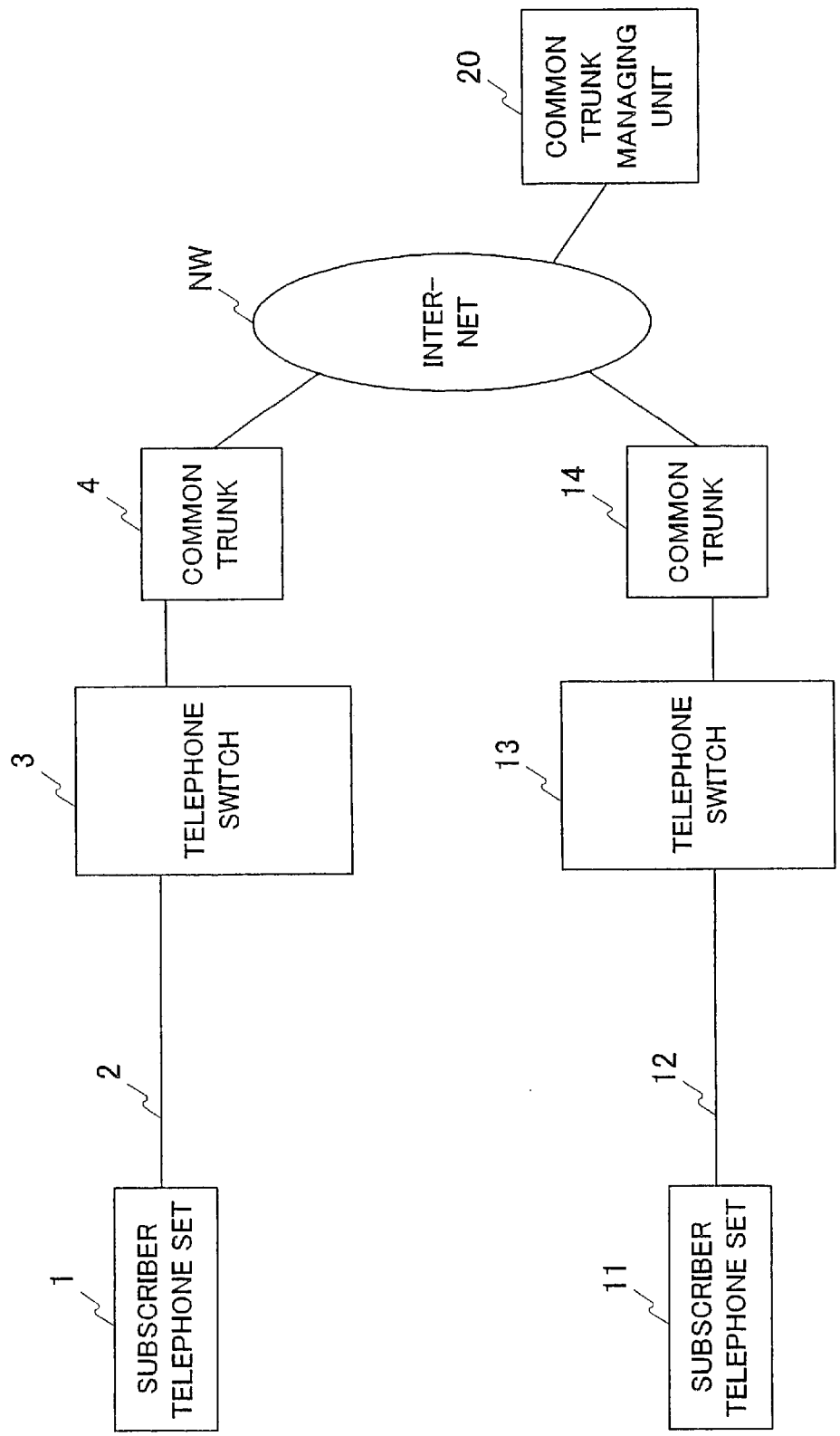
FIG. 3 is a block diagram showing a prior art telephone connection system.
Figure 4:
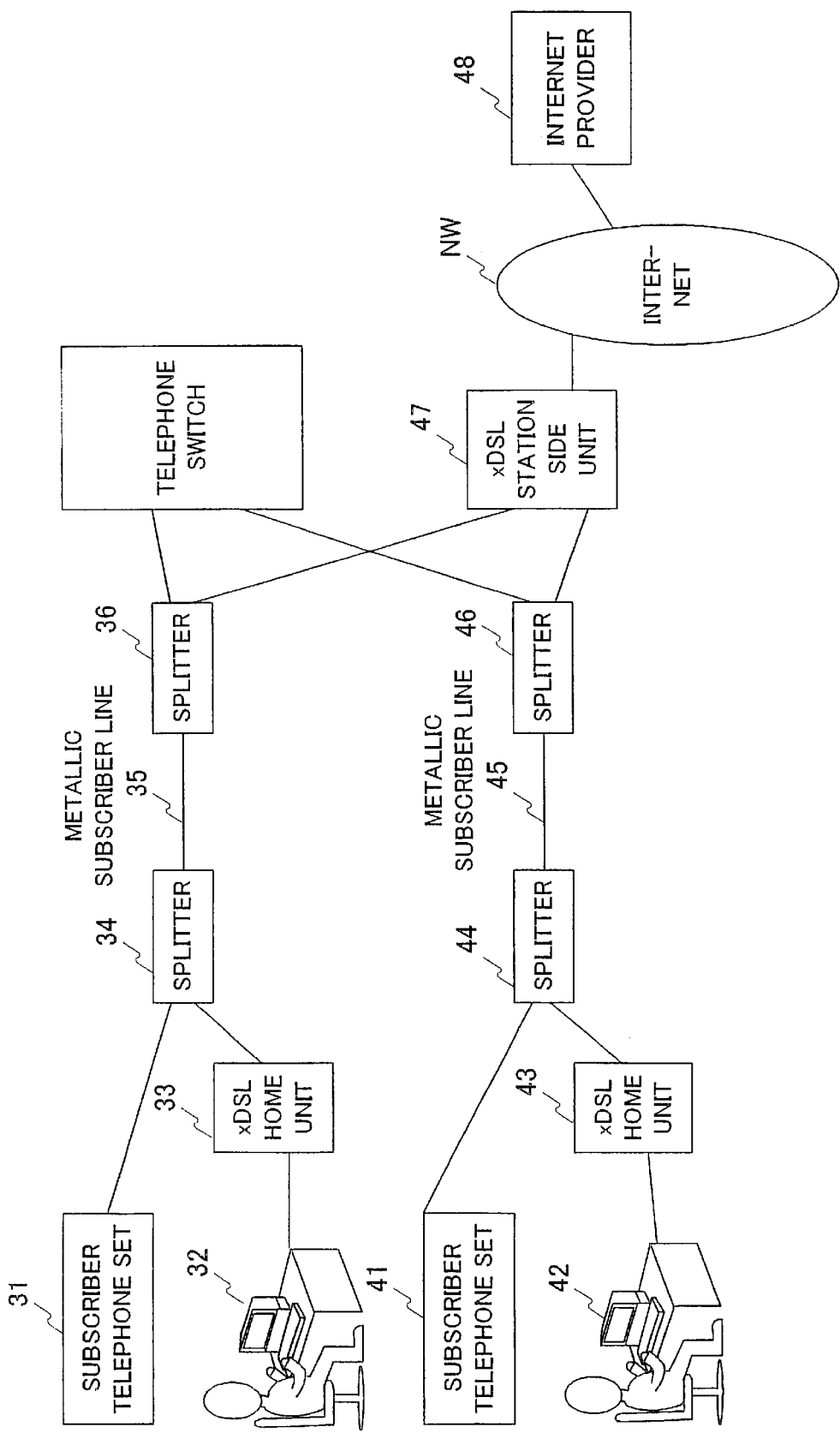
FIG. 4 is a schematic showing of a different prior art telephone connection system.

FIG. 2 is a schematic showing the the xDSL home unit 60 shown in FIG. 1.

As shown in FIG. 2, the xDSL home part 60 includes a switch unit 61, a telephone set interface part 62, a call arrival detecting part 63, a calling subscriber telephone number detecting part 64, a VoIP (Voice over IP) mechanism part 65, a data terminal interface unit 66, a control part 67 and an xDSL home modem 68. The switch part 61 is turned on when an externally transmitted call is received in the subscriber telephone set 51, and is turned off when an electronic mail over the like is transmitted from the xDSL home unit 60 via the xDSL line 72. Various kinds of signals are transmitted and received between the call arrival detecting part 63, the calling subscriber telephone number detecting part 64 or the VoIP mechanism part 65 and the subscriber telephone set 51 via the telephone set interface part 62. The call arrival detecting part 63 detects the call reception in the subscriber telephone set 51. The calling subscriber telephone number detecting part 64 detects the telephone number of the calling subscriber when this telephone number is transmitted.

The VoIP mechanism part 65 has a function of converting analog signal fed from the telephone set interface part 62 to a packet signal and a function of converting packet signal to analog signal and feeds this analog signal back to the telephone set interface part 62. Various kinds of signals are transmitted and received between the subscriber terminal 52 and the control part 67 via the data terminal interface part 66. The control part 67 includes a central processing unit (hereinafter referred to as "CPU") 67a, a recording medium (such as a read-only memory, hereinafter referred to as "ROM"), in which a control program for operating the CPU 67a and an electronic mail generating part 67c. The control part 67 starts the electronic main generating part 67c for generating an electronic mail. The xDSL home modem 68 converts the electronic mail generated in the electronic mail generating part 67c to a signal complying with the xDSL line 72. The xDSL home unit 90 is the same in structure as the xDSL home unit 60.

Now, a telephone connecting method in this embodiment of the telephone connection system will now be described with reference to FIGS. 1 and 2.

When the call from the subscriber telephone set 81 is generated by the operation of the calling subscriber and transmitted via the telephone switch 74 and the metallic subscriber line 72 to be received in the subscriber telephone set 51 of the called subscriber, a call signal is transmitted via the metallic subscriber line 72, the splitter 71 and the switch 61 in the xDSL home unit 60 to the subscriber telephone set 51 and the telephone set interface part 62 and detected in the call arrival detecting part 63. In the case of utilizing a caller's telephone number informing service, the telephone set interface part 62 outputs a reception ready confirmation signal to urge the caller's telephone number data, and the returned caller's telephone number data is received in the calling subscriber telephone number detecting part 64.

When the reception is completed, the control part 67 starts the electronic main generating part 67c and outputs a called electronic mail via the xDSL home modem 68, the splitter 71, the metallic subscriber line 72, the splitter 73, the xDSL station side unit 104 and the internet NW to the internet provider 105 by using the caller's telephone number data and the electronic mail address data corresponding to the subscriber telephone set 51 preliminarily registered in the control part 67. The called electronic mail is received in the internet provider 105. The called electronic mail is transmitted from the xDSL home unit 60 connected to the subscriber telephone set 51, and the internet provider 105 recognizes that the called electronic mail is to inform the reception of the call by the calling subscriber. The internet provider 105 is preset that the called subscriber transmits the called electronic mail to electronic mail reception in the portable telephone set 107. Thus, the called electronic mail is transmitted from the internet provider 105 via the internet NW to the portable telephone radio base station 106 and thence transmitted to the portable telephone set 107.

The called electronic mail is received in the portable telephone set 107, and the user of the portable telephone set 107 (for instance, the called subscriber) knows from the content of the called electronic mail the calling subscriber is calling him or her. When the user of the portable telephone set 107 desires to answer a telephone call, he or she makes a telephone call by using connection data that is added to the called electronic mail with respect to the internet provider 105. On the basis of the connection data, the internet provider 105 makes connection via the internet NW to the xDSL station side unit 104 and thence the splitter 73, the metallic subscriber line 72 and the splitter 71 to the xDSL home unit 60.

In the xDSL home unit 60, the analog signal of the telephone call by the calling subscriber is inputted via the telephone set interface part 62 to the VoIP mechanism pat 65 for conversion therein to the packet signal. In the control part 67, header data corresponding to the portable telephone set 107 is added to the packet signal, and the resultant signal is outputted via the xDSL home modem 68 and the splitter 71 to the metallic subscriber line 72. The packet signal is then received via the splitter 73, the xDSL station side unit 104 and the internet NW to the internet provider 105. The packet signal is transmitted from the internet provider 105 via the internet NW to the portable telephone set radio base station 106 and thence to the portable telephone set 107.

As has been shown, in this embodiment, when a call from the subscriber telephone set 81 by the operation of the calling subscriber 51, the xDSL home unit 60 transmits the called electronic mail indicative of the call reception via the internet NW to the portable telephone set 107, and when a reception request is outputted from the portable telephone set 107, the call of the subscriber telephone set 81 is transmitted to the portable telephone set 107. Thus, even when the called subscriber has gone out and can not off-hook the subscriber telephone set, it is possible, with the operation of the portable telephone set 107 by the called subscriber, to obtain telephone connection service over a broad zone.

While the embodiment of the present invention has been described with reference to the drawings, the specific construction of the embodiment is by no means limitative, and changes and modifications in the design may be made without departing from the gist of the present invention.

For example, in the embodiment the VoIP mechanism part 65 is adapted to execute conversion between the analog signal and the packet signal, this conversion may be executed in the portable telephone set 107, the portable telephone set radio base station 106, the internet provider 105 or the xDSL station side unit 104 as well. Also, in the embodiment the subscriber telephone set 81 is operated by the calling subscriber and the subscriber telephone set 51 is operated by the called subscriber, it is possible to provide a converse arrangement, Furthermore, the portable telephone radio base station 106 and the portable telephone set 107 may be of any type so long as they are a terminal unit connected to the internet NW such as a personal computer. Still further, it is possible to provide the splitters 71 and 101 shown in FIG. 1 in the xDSL home units 60 and 90, respectively. Yet further, while the above embodiment has been described in connection with the case of the transmission of a call of the subscriber telephone set 81 to the portable telephone set 17 by the calling subscriber's operation, it is also possible to arrange such that an electronic mail or the like transmitted from the subscriber terminal 82 is received in the subscriber terminal 52 and, like the telephone call, is transmitted to the portable telephone set 107. Further, the portable telephone set 107 may be a PDA (Personal Digital Assistants) as well. Moreover, the fast digital communication line is not limited to the xDSL line, and it is possible to use any line as well so long as it permits realization of the fast communication.

As has been described in the foregoing, with the construction according to the present invention, when a call generated from a first subscriber telephone set by the operation of the calling subscriber is received in the first subscriber telephone set, the home transmission unit transmits the called electronic mail indicative of the call reception is transmitted via the internet NW to the terminal unit, and when a reception request is provided from the terminal unit, the call from the second subscriber telephone set is transmitted to the terminal unit. Thus, even when the called subscriber has gone and can not off-hook the first subscriber telephone set it is possible, with the operation of the terminal unit by the called subscriber, to obtain telephone connection service over a broader zone.

What is claimed is:

1. A telephone connection system comprising a first subscriber telephone set, a home transmission unit, a subscriber line, a telephone switch, a second subscriber telephone set, a fast digital communication line, a fast digital switch unit, an internet, an internet provider and a terminal unit, wherein:

when the call of the second subscriber telephone set is received via the telephone switch and the subscriber line to the first subscriber telephone set, the home transmission unit generates a called electronic mail indicative of the call reception, and feeds said mail via the fast digital communication line, the fast digital switch unit and the internet to the internet provider for transmission of the data via the internet to the terminal unit, and when a reception request is provided from the terminal unit, the home transmission unit feeds the call via the fast digital communication line, the fast digital switch and the internet to the internet provider for transmission of the data via the internet to the terminal unit.

2. A telephone connection system comprising a first subscriber telephone set, a home transmission unit, a subscriber line, a telephone switch, a second subscriber telephone set, a fast digital switch unit, an internet, an internet provider and a terminal unit, wherein:

when the call of the second subscriber telephone set is received via the telephone switch and the subscriber line to the first subscriber telephone set, the home transmission unit generates a called electronic mail indicative of the call reception, and feeds said mail via the subscriber line as a fast digital communication line, the fast digital switch unit and the internet to the internet provider for transmission of the data via the internet to the terminal unit, and when a reception request is provided from the terminal unit, the home transmission unit feeds the call via the fast digital communication line, the fast digital switch and the internet to the internet provider for transmission of the data via the internet to the terminal unit.

3. The telephone connection system according to claim 1, wherein:

the fast digital communication line is an xDSL (x Digital Subscriber Line) common to the subscribers.

4. A telephone connection method comprising steps of:

in response to receipt of a call of a second subscriber telephone set via a telephone switch and a subscriber line to a first subscriber telephone set, generating a called electronic mail indicative of the call reception by a home transmission unit;

feeding the mail via a fast digital communication line, a fast digital switch unit and an internet to an internet provider for transmission of data via the internet to a terminal unit; and in response to receipt of a reception request from the terminal unit, the home transmission unit feeding the call from via the fast digital communication line, the fast digital switch and the internet to the internet provider for transmission of the data via the internet to the terminal unit.

5. A telephone connection method comprising steps of:

in response to receipt of a call of a second subscriber telephone set via a telephone switch and a subscriber line to a first subscriber telephone set, a home transmission unit generating a called electronic mail indicative of the call reception;

feeding the mail via a subscriber line as a fast digital communication line, a fast digital switch unit and an internet to an internet provider for transmission of data via the internet to a terminal unit; and in response to receipt of a reception request from the terminal unit, feeding the call from the home transmission unit via the fast digital communication line, the fast digital switch and the internet to the internet provider for transmission of the data via the internet to the terminal unit.

6. A home transmission unit comprising:

means for generating a called electronic mail indicative of a call reception and sending out said mail via a fast digital communication line to a predetermined terminal unit when an external call is received via a subscriber line in a subscriber telephone set; and means for transmitting the call via the fast digital communication line when a reception request is provided from the terminal unit.

7. The telephone connection system according to claim 6, wherein:

the fast digital communication line is an xDSL (x Digital Subscriber Line) common to the subscribers.

8. A telephone connection system comprising:

means for generating from an xDSL home unit an electronic mail indicative of a call reception with a metallic subscriber line used as an xDSL line in response to receipt of a call from a subscriber telephone set via a telephone switch and the metallic subscriber line in a subscriber terminal;

means for feeding the generated electronic mail via the xDSL line, an xDSL station side unit and an internet to an internet provider;

means for transmitting the mail via the internet to a portable telephone radio base station and a portable telephone set; and means for feeding by the xDSL home unit the call from the subscriber telephone set via the xDSL line, the xDSL station side unit and the internet to the internet provider for transmission of the call via the internet to the portable telephone radio base station and to the portable telephone set, in response to provision of a reception request from the portable telephone set.

* * * * *